(12) United States Patent
Cleary et al.

(10) Patent No.: US 9,603,191 B2
(45) Date of Patent: Mar. 21, 2017

(54) APPARATUS AND METHOD FOR PROVIDING ACCESS TO INTERNET RESOURCES IN A WIRELESS COMMUNICATIONS NETWORK

(75) Inventors: David Cleary, Atholone (IE); Karl Quinn, Dublin (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 810 days.

(21) Appl. No.: 12/936,346

(22) PCT Filed: Apr. 3, 2008

(86) PCT No.: PCT/EP2008/054038
§ 371 (c)(1),
(2), (4) Date: Jan. 18, 2011

(87) PCT Pub. No.: WO2009/121413
PCT Pub. Date: Oct. 8, 2009

(65) Prior Publication Data
US 2011/0110317 A1    May 12, 2011

(51) Int. Cl.
*H04L 29/08* (2006.01)
*H04W 88/18* (2009.01)
(Continued)

(52) U.S. Cl.
CPC .... *H04W 88/182* (2013.01); *G06F 17/30902* (2013.01); *H04L 67/02* (2013.01);
(Continued)

(58) Field of Classification Search
CPC ..... H04L 12/14; H04L 67/2842; H04H 20/93; H04W 4/24; H04W 76/002; G06F 17/30902; H04N 21/2183
(Continued)

(56) References Cited

U.S. PATENT DOCUMENTS 5,682,514 A * 10/1997 Yohe .................. G06T 9/00
                                                    711/118
6,526,448 B1 * 2/2003 Blewett .................. 709/238
(Continued)

FOREIGN PATENT DOCUMENTS

JP    WO 2008023792 A1 *  2/2008  .......... H04W 72/005
KR      20050067955 A      7/2005
(Continued)

OTHER PUBLICATIONS

English Machine Translation for WO2008023792 A1.*
International Search Report for PCT/EP2008/054038, mailed Mar. 3, 2009.

*Primary Examiner* — Andrew Chriss
*Assistant Examiner* — Salvador E Rivas
(74) *Attorney, Agent, or Firm* — Nixon & Vanderhye, P.C.

(57) ABSTRACT

A method and apparatus for providing access to internet resources in a wireless communications network is disclosed. The method comprises storing (108) in a memory located in said communications network at least one file from an internet resource if monitoring (102) user equipment in a predefined area shows that a number of requests from said user equipment in said area to access said internet resource exceeds (106) a first threshold. The method further comprises providing (110) access to said internet resource using said at least one file stored in said memory.

21 Claims, 7 Drawing Sheets

(51) Int. Cl.
  *G06F 17/30* (2006.01)
  *H04N 21/2183* (2011.01)
  *H04W 28/08* (2009.01)

(52) U.S. Cl.
  CPC ...... *H04L 67/2833* (2013.01); *H04L 67/2842* (2013.01); *H04N 21/2183* (2013.01); *H04W 28/08* (2013.01)

(58) Field of Classification Search
  USPC ........................................................ 370/329
  See application file for complete search history.

(56) References Cited

U.S. PATENT DOCUMENTS

| | | | |
|---|---|---|---|
| 6,807,607 B1* | 10/2004 | Lamparter | 711/133 |
| 2002/0054567 A1* | 5/2002 | Fan | H04L 47/11 370/230 |
| 2002/0083148 A1* | 6/2002 | Shaw et al. | 709/214 |
| 2005/0132049 A1 | 6/2005 | Inoue et al. | |
| 2006/0039318 A1* | 2/2006 | Oh | H04L 5/0007 370/328 |
| 2006/0248442 A1* | 11/2006 | Rosenstein et al. | G06F 17/24 715/205 |
| 2007/0047568 A1* | 3/2007 | Wang | G06Q 10/087 370/429 |
| 2008/0019325 A1* | 1/2008 | Radpour | 370/335 |
| 2008/0043692 A1* | 2/2008 | Morita | G08G 1/005 370/338 |
| 2008/0049630 A1* | 2/2008 | Kozisek | H04L 41/0823 370/250 |
| 2008/0222268 A1* | 9/2008 | Miyamoto et al. | H04L 67/02 709/217 |
| 2008/0229025 A1* | 9/2008 | Plamondon | 711/126 |
| 2009/0109922 A1* | 4/2009 | Livanos | 370/331 |
| 2010/0254274 A1* | 10/2010 | Westerberg | H04W 24/02 370/252 |

FOREIGN PATENT DOCUMENTS

| | | |
|---|---|---|
| WO | WO2005/048011 A2 | 5/2005 |
| WO | WO 2008023792 A1 * | 2/2008 |

* cited by examiner

APPARATUS AND METHOD FOR PROVIDING ACCESS TO INTERNET RESOURCES IN A WIRELESS COMMUNICATIONS NETWORK

This application is the U.S. national phase of International Application No. PCT/EP2008/054038, filed 3 Apr. 2008, which designated the U.S., which is hereby incorporated by reference.

TECHNICAL FIELD

The present invention relates to wireless communications networks, in general, and in particular to providing location based caching access to internet resources to user equipment operating in a wireless communications network.

BACKGROUND

In cellular wireless communications networks each cell has a base station that a user's mobile phone communicates directly with. The number of cells that serves an area depends on the density of population in that specific area. Traditionally, these cells have mainly handled voice and limited data (e.g. SMS) but more recently in 3 G networks mobile broadband has brought the World Wide Web and other Internet based communications (email, Instant Messaging, etc) directly to a user's handset.

With the advent of HSDPA (High-Speed Downlink Packet Access) and LTE (Long Term Evolution) more and more data will need to be transferred to the radio network. 3 G LTE/SAE (Long Term Evolution/System Architecture Evolution) is the next step in terms of user-service experience, improving latency, capacity and throughput. It will allow data rates above 100 Mbps. 3 G LTE supports both FDD (Frequency Division Duplex) and TDD (Time Division Duplex) with the same specification and hardware components, allowing for a large increase in system capacity and reduced cost per gigabyte. Present solutions, however, make repeated, often redundant, calls for data from the edge of the network through the radio and core parts of the telecoms network to load balanced, solutions and on to the internet in order to obtain the requested data. Subsequently, the number of requests to a given URL (Uniform Resource Locator) increases and response times for the delivery of information as well as amount of data being transferred across the network increase significantly.

SUMMARY

According to a first aspect of the present invention there is provided a method of providing access to internet resources in a wireless communications network. The method comprises storing in a memory located in said communications network at least one file from an internet resource if monitoring user equipment in a predefined area shows that a number of requests from said user equipment in said predefined area to access said internet resource exceeds a first threshold. The method further comprises providing access to said internet resource using data stored in said memory.

According to a second aspect of the present invention there is provided an apparatus for a wireless communications network. The apparatus comprises a number of interfaces to network nodes of said wireless communications network and is adapted to receive from said network nodes information about a number of user equipment in a predefined area and information about internet resources requested to access by user equipment. The apparatus further comprises a control unit, wherein if a number of requests to access a specific internet resource from user equipment in said predefined area exceeds a first threshold said control unit is adapted to request storing in a memory located in said communications network at least one file from said specific internet resource requested by said user equipment.

According to a third aspect of the present invention there is provided a wireless communications network comprising a first node for location registration of user equipment, a second node operating as a gateway between said communications network and Internet as well as an apparatus comprising a number of interfaces to said first and second network nodes. Said apparatus is adapted to receive via a first interface information about a number of user equipment in a predefined area and via a second interface information about internet resources requested to access by user equipment. The apparatus further comprises a control unit, wherein if a number of requests to access a specific internet resource from user equipment in said predefined area exceeds a first threshold said control unit is adapted to request storing in a memory located in said communications network at least one file from said specific internet resource requested by said user equipment.

Further features of the present invention are as claimed in the dependent claims.

The present invention has several advantages over the known solutions. The main advantages are mentioned below.

Reduced calls to the same information at a URL. When the caching mechanism is active then the S-GW (Serving Gateway) only needs to update the cache periodically according to the above method (as if the cache itself was a user seeking information). In this situation the number of calls to a URL is reduced when many users make requests to that URL.

Increased efficiency in transferring data for the core network. The amount of data that is transferred in the core network decreases as the number of calls to a URL decreases when the caching mechanism is active.

Faster delivery of the requested content to the subscriber. When the data is stored closer to the user in the telecoms network then latencies can be reduced. This means that the requested content is delivered to the subscriber in a shorter period of time.

BRIEF DESCRIPTION OF THE DRAWINGS

The present invention will be understood and appreciated more fully from the following detailed description taken in conjunction with the drawings in which.

DETAILED DESCRIPTION

The invention is based on introduction of a cache and a caching algorithm into cellular network in order to introduce added data transfer efficiencies into the network, specifically, although not exclusively, for Mobile Internet information. In this invention a cache is placed close to the subscriber in the network.

One can imagine a scenario where 50,000 football fans are exiting football stadium. The base stations providing 3 G communications and Mobile Internet to subscriber handsets are very active after the match as fans go to web sites to get the latest score lines of other matches. As the hundreds, or thousands, of fans check the same football score website identified by a specific URL the data is repeatedly sought and transferred across the cellular network through the core and the Internet.

Figure 1:
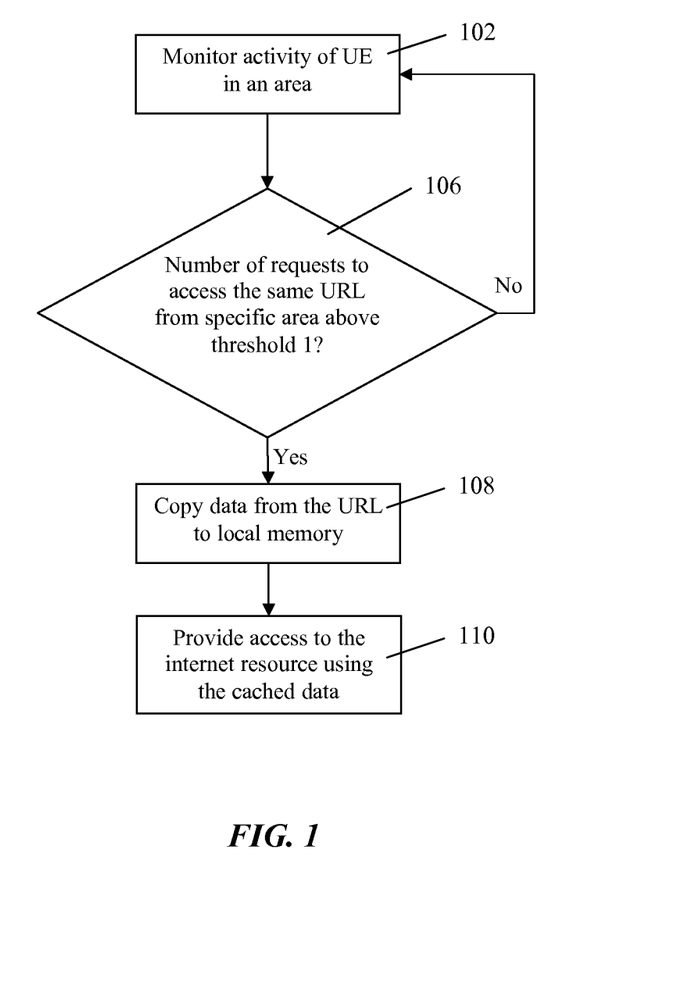
FIG. 1 is a diagram illustrating a method of providing access to internet resources in a wireless communications network in one embodiment of the present invention.

In one embodiment, illustrated in FIG. 1 a method of providing access to internet resources (such as internet resources 810 in FIG. 8) in a wireless communications network is presented. The method comprises monitoring 102 activity of user equipment in a predefined area (e.g. vicinity of a football stadium after a match). If the monitoring shows 106 that one website is very popular amongst the users of user equipment present in said predefined area. The content of this website, identified by a URL, is copied 108 to a local memory within the telecommunications network. When the data from the website is finally copied, the access to this internet resource is provided 110 to the users in said predefined area using the data stored in said local memory. In operation, in order to initiate copying data from said popular URL a number of requests to access said URL from user equipment in said predetermined area must exceed a predefined threshold.

Figure 1A:
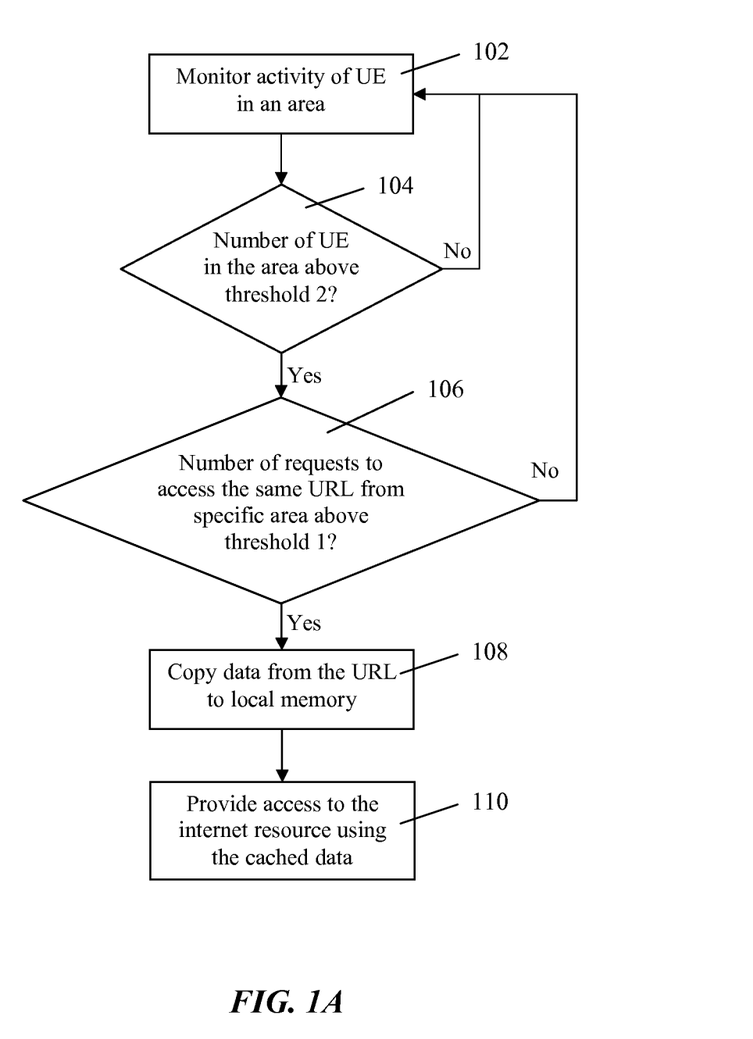
FIG. 1A is a diagram illustrating a method of providing access to internet resources in a wireless communications network in one embodiment of the present invention.

In an alternative embodiment illustrated in FIG. 1A a method of providing access to internet resources in a wireless communications network is presented. The method is based on an algorithm that checks the number of user equipment (UE) operating in a predefined area and the number of requests to access specific internet resource. In operation, activity of UE is monitored 102 in a predefined area.

In one embodiment the predefined area is a cell in a cellular network. In an alternative embodiment it can be a cluster of cells in a specific area. In yet another embodiment the area may be defined regardless of the cells of the communications network (e.g. 1 km around a football stadium).

If said monitoring 102 of UE activity shows that a number of user equipment in said predefined area exceeds a second threshold 104 in the next step it is checked if a number of requests from said user equipment in said area to access the same internet resource (Such as internet resource 810 in FIG. 8) exceeds a first threshold 106. When these two conditions are met it means that it would be beneficial for the users and for the network itself to bring the frequently accessed data closer to the users. Therefore in the next step the data from the internet resource requested by the users is copied 108 to a memory located in the cellular network. The way the data is located and then transferred from said URL is as if the cache itself was a user seeking information on this web site. In a simplest case the data copied to local memory can be a single file, e.g. a audio and video content frequently accessed by the UE. In most likely scenario it will be content of a web identified by a specific URL in order to give the user experience that is not different from accessing the URL itself. Once the data is stored 108 in said local memory users requesting access to said URL are provided 110 with data stored in said local memory.

The benefit of checking additionally if a number of user equipment in said predefined area is above a second threshold allows for quick discrimination of situations when there is simply not enough user equipment in said predefined area to exceed the first threshold.

In one embodiment all requests to access said URL are directed to the local memory. However, in an alternative embodiment it is possible that in case of really huge demand to access said URL a load balancing algorithm is implemented and part of the users is directed to the cached data and part to the original URL.

In a preferred embodiment the method comprises updating Call Data Records of users accessing the data stored in said memory.

Figure 3:
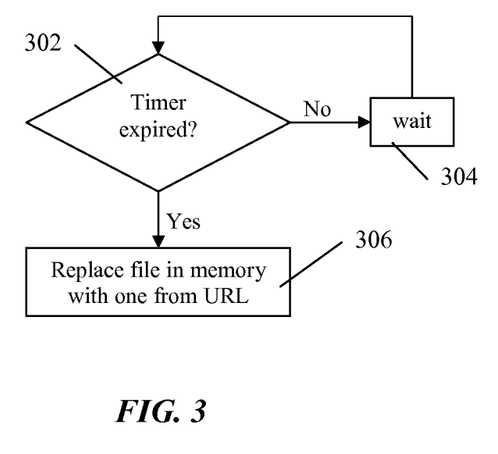
FIG. 3 is a diagram illustrating a method of providing access to internet resources in a wireless communications network in one embodiment of the present invention.
Figure 8:
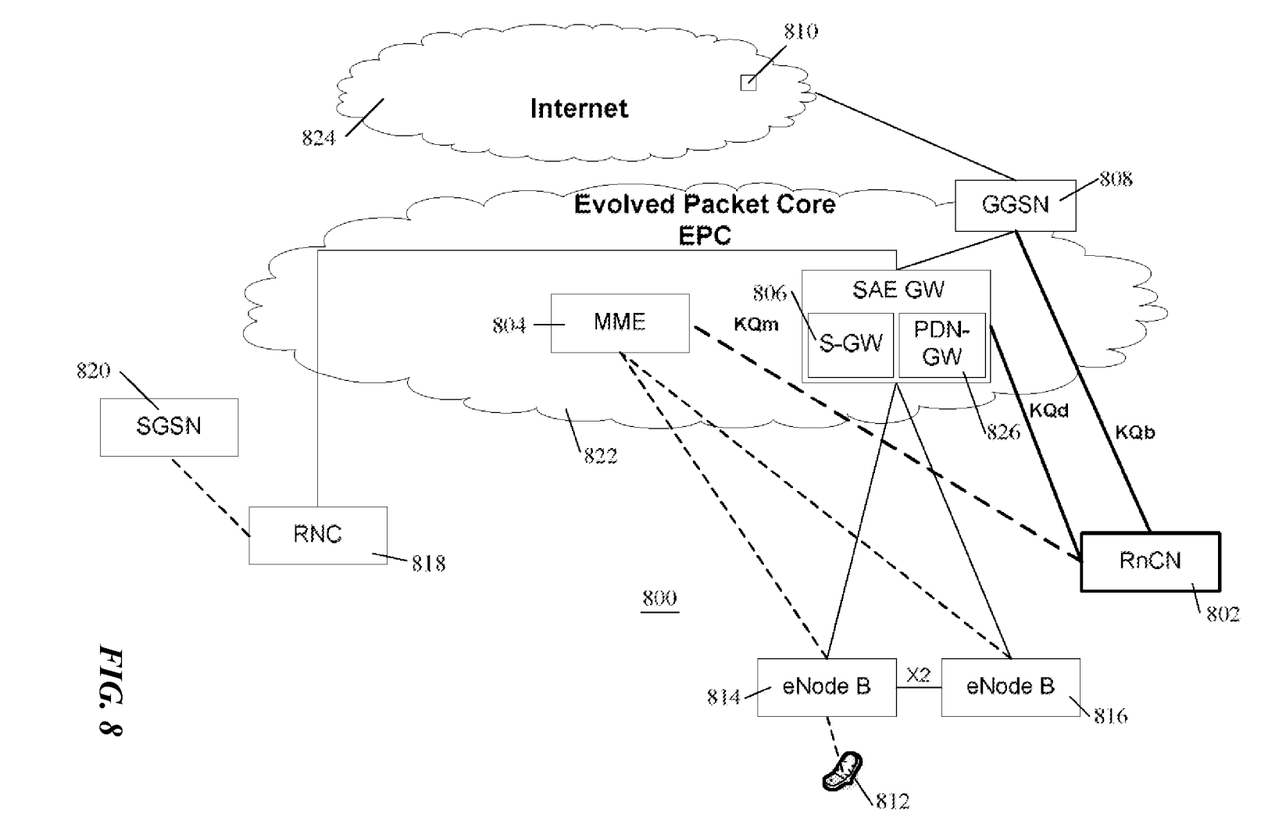
FIG. 8 is a diagram illustrating cellular communications network in one embodiment of the present invention.

Also preferably the method comprises updating the contents of the cache with newer versions of the files copied from said internet resource (such as internet resource 810 in FIG. 8). In one embodiment, illustrated in FIG. 3, the content of the cache is updated 306 periodically and this is triggered by expiring timer 302, 304. In this embodiment the content of the cache is replaced with content taken from the URL and it is not checked if the files have been changed at source (i.e. URL).

Figure 4:
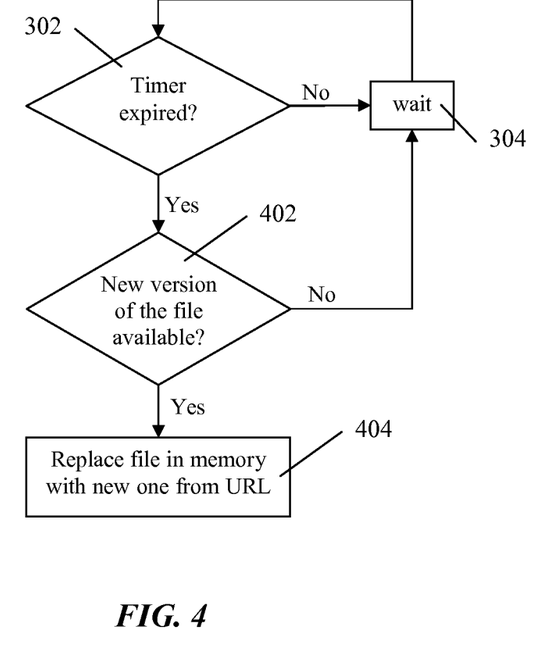
FIG. 4 is a diagram illustrating a method of providing access to internet resources in a wireless communications network in one embodiment of the present invention.

In an alternative embodiment, illustrated in FIG. 4, after expiring of the timer 302, 304 it is checked if the version of the files at said URL changed. If a new version is available 402 the new version of the file is used to update the cache 404.

Figure 2:
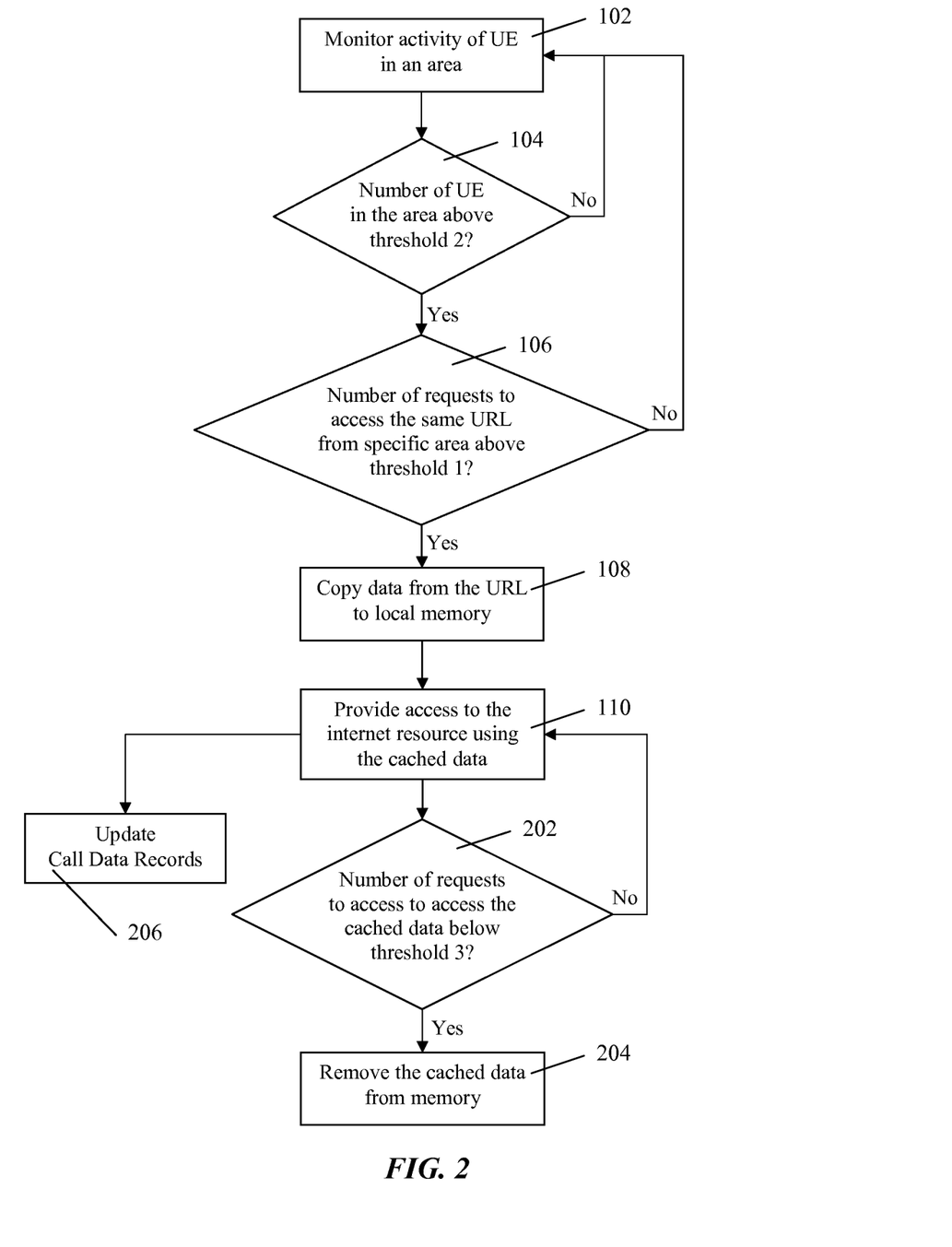
FIG. 2 is a diagram illustrating a method of providing access to internet resources in a wireless communications network in one embodiment of the present invention

With reference to FIG. 2 a preferred embodiment of the present invention is presented. In this embodiment the steps performed in order to provide access to internet resources using a memory located in the cellular network containing cached content a of specific URL are the same as in the embodiment illustrated in FIG. 1A. This embodiment further comprises removing 204 said cached content from the memory if a number of requests to access said file drops below a third threshold 202.

In one embodiment the third threshold is equal the first threshold, which means that in order to keep the content of a specific web site cached in said memory the number of request to access it must remain above the threshold required to form the cache.

In an alternative embodiment the third threshold lies below the first threshold and this provides a hysteresis that prevents the cache from being emptied due to some statistical oscillations in the number of requests.

One possible example of the algorithm implemented in the embodiments of the present invention is presented below in a pseudocode.

WHEN [threshold_2] is exceeded AND IF [threshold_1] for URL request is exceeded
    THEN (i) start cache for that URL
        (ii) intercept all requests to that URL from subscribers
        (iii) reply to subscriber with recently cached data
        (iv) update the cache every [update] seconds, until requests for URL decrease below [ threshold_3]

Note:

[threshold_2] is the numeric value that represents the number of mobile terminals at a particular location;

[threshold_1] and [threshold_3] are arbitrary numeric values that can be set statically or dynamically depending on the popularity of a URL;

[update] is an arbitrary value of time in seconds that can be set statically or dynamically depending on the popularity of a URL.

Figure 5:
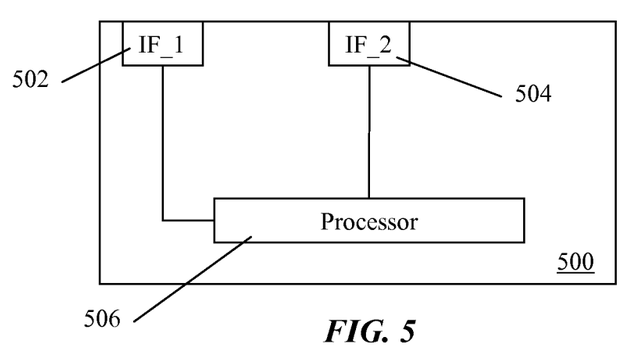
FIG. 5 is a block diagram illustrating an apparatus in one embodiment of the present invention.

With reference to FIG. 5 one embodiment of an apparatus 500 for use in a wireless communications network in accordance with the present invention is presented. The apparatus 500 comprises a first interface 502 for connecting to a Mobility Management Entity node. Via said first interface 502 the apparatus 500 receives information about a number of user equipment in a predefined area.

Embodiments of this invention are described herein with reference to 3 GPP Long Term Evolution networks; however the invention is also applicable to other types or generations of wireless telecommunications networks. Mobility Management Entity is a term used in 3 GPP Long Term Evolution networks, but in alternative embodiments, different nodes capable of providing this information can use said first interface to provide the required information.

The apparatus 500 also comprises a second interface 504 for connecting to a Gateway GPRS Support Node (GGSN) (such as GGSN 808 in FIG. 8) in of the network (such as network 800 of FIG. 8). The GGSN (such as GGSN 808 in FIG. 8) provides to the apparatus 500 information about internet resources access to which has been requested by all User Equipment served by the GGSN (such as GGSN 808 of FIG. 8) or PDN Gateway (such as PDN Gateway 826 of FIG. 8). In this embodiment the apparatus 500 filters out and discards information about UE served by said GGSN (such as GGSN 808 of FIG. 8) that is not located in the predefined area. In this embodiment, in order to carry out the filtering, the information received via the first interface 502 includes a list of User Equipment ID that is located in the predefined area.

Alternatively, the information received via the second interface 504 comprises information about internet resources requested by said user equipment located in said predefined area.

In alternative embodiment the second interface 504 can be used for connecting the apparatus 500 to a Packet Data Networking Gateway (PDN Gateway) (such as PDN Gateway 826 of FIG. 8) of the wireless communications network. In yet another alternative embodiment the second interface 504 connects the apparatus 500 to a Serving Gateway (S-GW) (such as S-GW 806 of FIG. 8) of the wireless communications network in order to receive information about internet resources access to which has been requested by the UE (such as UE 812 of FIG. 8).

The apparatus 500 further comprises a control unit 506 which receives said information about the number of UE in said predefined area and URLs access to which has been requested by said UE. The control unit 506 processes the received information and if the number of the user equipment exceeds a second threshold and a number of requests to access a specific internet resource 810 exceeds a first threshold said control unit 500 requests storing in a memory the contents of said specific internet resource requested by said user equipment.

Figure 6:
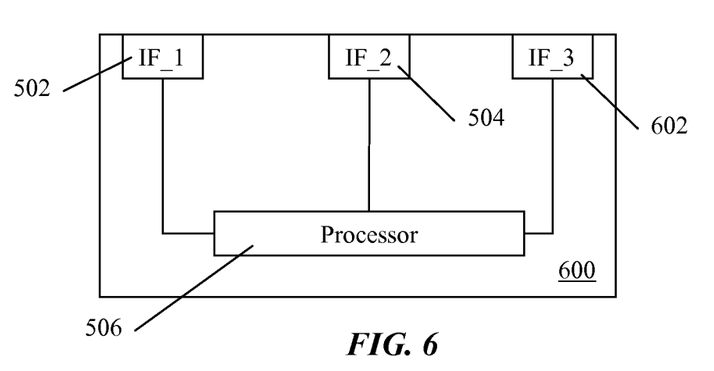
FIG. 6 is a block diagram illustrating an apparatus in one embodiment of the present invention.

With reference to FIG. 6 a preferred embodiment of the present invention is presented. The apparatus 600 comprises, in addition to the components illustrated in FIG. 5, a third interface 602. This third interface 602 is used for providing information required for updating Call Data Records for charging users accessing internet resources (whether directly on the remote server in the internet 824 or locally cached in said memory). If the internet access is charged at a flat rate the updates to Call Data Records are charged at zero cost, but the usage of the service can be audited. In one embodiment the third interface 602 is for connecting said apparatus 600 to the PDN Gateway 826. Alternatively the third interface is connected to the GGSN 806. In yet another alternative embodiment the third interface 602 is adapted to provide said information for updating Call Data Records via a Serving Gateway (S-GW) 806.

Figure 7:
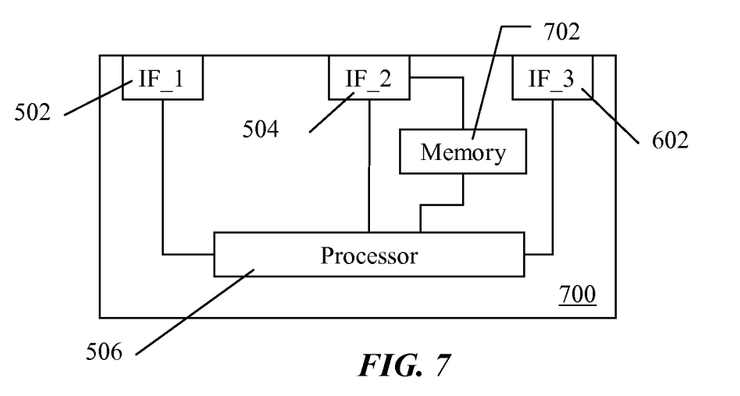
FIG. 7 is a block diagram illustrating an apparatus in one embodiment of the present invention.

The memory used for caching data from the popular website identified by the URL requested by the user equipment can be located in various parts of said communications network. In one embodiment, illustrated in FIG. 7, the apparatus 700 comprises all the components illustrated in FIG. 6 and additionally a memory 702. In this embodiment the memory 702 is adapted to store the at least one file requested by the UE from a specific internet resource. As discussed earlier in most cases it will be more than one file—the memory 702 will store a large number of files from a website in order to give the user the same experience as when accessing said website located on a remote server. It is also possible that the embodiment of the invention illustrated in FIG. 5 can be modified by adding a memory unit in a similar way as illustrated in FIG. 7

It is not, however, required that the apparatus which carry out the algorithm discussed earlier is co-located with the memory. The memory can be part of one of the other nodes of the cellular network. Possible examples of implementing the memory for storing data requested from said internet resource include co-locating it with MME 804, eNodeB 814, 816 in the case of LTE networks or with NodeB 910 in the case of 3 G networks illustrated in FIG. 9.

Figure 9:
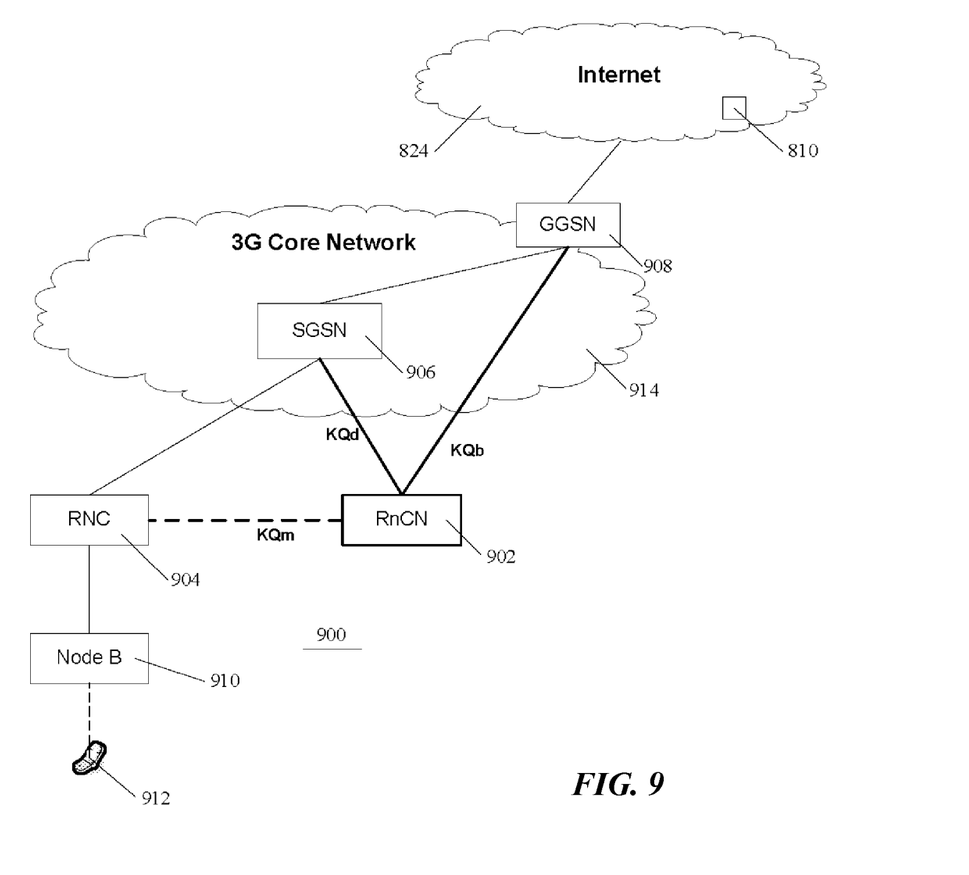
FIG. 9 is a diagram illustrating cellular communications network in one embodiment of the present invention.

FIG. 8 and FIG. 9 illustrate networks 800 and 900 in which the apparatus 500, 600, 700 discussed above is implemented in form of a logical function called a Radio Network Caching Node (RnCN) 802 in FIG. 8 or 902 in FIG. 9.

In one embodiment the apparatus 500, 600, 700 is a standalone node for use in the wireless communications network or alternatively it can be a part of another node operating in said network (e.g. GGSN 808 or PDN Gateway 826). In order to implement the method and apparatus of the invention in the network a tunneling mechanism between two tunnels in S-GW 806 (one towards eNodeB 814, 816 and one towards PDN GW 826) should be implemented. This means that the tunnel may have to be broken in order to implement the mapping. However in one embodiment if the apparatus 802 is co-located at the tunnel endpoint (i.e. PDN-GW 826) then the tunnel does not need to be broken. In an alternative embodiment it is possible to break the tunnel for redirecting to standalone RnCN node 802.

Although the embodiments discussed above considered only one URL access to which was requested so frequently that it crossed the first threshold it is within contemplation of the present invention that in its various embodiments the invention also covers situations when more than one internet resource is requested so frequently that the conditions specified by the algorithm are met. In these situation data from more than one internet resource is cached in said memory in the cellular communications network.

FIG. 8 illustrates a wireless communications network 800 in accordance with one embodiment of the present invention. A logical function called a Radio Network Caching Node (RnCN) 802, which is an implementation of the apparatus 500, 600 and 700 is deployed in the network 800. In various embodiments the RnCN 802 can be implemented in hardware or in software or partially in hardware and software. It is important to note that operations, functionality, and workflows in the core network and radio network are not affected by the addition of the RnCN 802.

FIG. 8 illustrates how the RnCN 802 interacts with LTE environment. In the embodiment presented in FIG. 8 the RnCN 802 is located on the border between LTE 800 and core networks 822. It is important to note that the S-GW 806, GGSN 808, RNC 818, SGSN 820, MME 804, eNode B 814 and 816, PDN-GW 826 as well as RnCN 802 are all elements that can be managed through the OSS/BSS (Operations Support System/Business Support Systems) environment.

In the embodiment depicted in FIG. 8 the connections between the RnCN 802 and the Mobility Management Element 804, Serving Gateway (S-GW) 806, and GGSN 808 are used for the reasons discussed below.

KQm (Mobility Information)

A first interface for connection between the RnCN 802 and the Mobility Management Entity (MME) 804 is used to query mobility information. In this way mobility information is retrieved over said first interface from the MME labeled 'KQm' in FIG. 8. The mobility information allows the caching algorithm to take into account the density of users in a predefined area. This density information can be used in the decision making process regarding the activation of the cache memory. In a preferred embodiment the MME 804 provides a list of user equipment located in the predefined area.

KQd (URL Information)

The connection (labeled 'KQd' in FIG. 8) between the S-GW 806 and the RnCN 802 enables the RnCN 802 to retrieve URL identifiers from the S-GW 806. These URL's are required by the caching algorithm as they will be used to select URL's that need to be cached and subsequently provided to requesting users. In a preferred embodiment S-GW 806 provides a list of URL identifiers and a list of UE requesting access to said URLs. In order to retrieve this information a deep packet inspection mechanism within the S-GW to parse URLs is implemented. In one embodiment the mechanism is based on the packet filtering mechanism that is present in the Packet Data Networking (PDN) Gateway 826. In alternative embodiments of this invention the RnCN 802 can be connected via a second interface (KQd) to a node other that S-GW 806 if said node has or can obtain information about URLs access to which is requested by the user equipment 812. In these alternative embodiments the RnCN 802 can receive via the second interface said information from GGSN 808 or Packet Data Networking Gateway (PDN-GW) 826. In alternative embodiments the present invention is also as applicable to URI's (Uniform Resource Identifier) as it is to URL's (Uniform Resource Locator).

The RnCN 802, whether implemented in software or in hardware, comprises a control unit that processes information received on the first and second interfaces. This information is processed in accordance with the algorithm described above with reference to embodiments of the method according to the present invention. If the number of the user equipment in said predefined area exceeds a second threshold and a number of requests to access a specific internet resource from user equipment in said predefined area exceeds a first threshold said control unit requests storing in a memory located in said communications network the contents of the popular internet resource. Popular in the context of this invention means that a number of requests to access this internet resource is high (e.g. above said first threshold). In this way if there is a high density of UE and there is an internet resource (website) very popular amongst the users in said area the network can react to the increased demand by caching locally contents of the website popular amongst the user at that time and in that place, and provide access to said popular website from said local cache.

In one embodiment the memory used for caching the contents of the website is shared between the RnCN 802 and another node of the network. This allows the logic function of the RnCN 802 to be located in one physical location (it can be co-located with another node) and the memory in another physical location. Alternatively the RnCN can be implemented in a way the both memory and logical function are co-located (as illustrated in FIG. 7).

Preferably the RnCN 802 uses a third interface for providing information necessary for updating Call Data Records of users accessing data stored in said memory. This interface is discussed below.

KQb (Billing Information)

The third interface (labeled 'KQb' FIG. 8) between the RnCN 802 and the GGSN 808 is used to update 206 the CDR (Call Data Records) of data connections to the internet 824. A new field in the CDR indicates Caching [enabled-|disabled]. When caching is enabled the RnCN 802 updates 206 the users CDR for the session to indicate if the user accessed the cached data. This information can in turn be used for a flexible billing model relating to the use of the caching of data services. Note that the 'KQb' connection is purely functional and could be implemented via the S-GW 806.

FIG. 9 illustrates a communications network 900 in another embodiment. In this embodiment 3 G network is considered. Interfaces KQm (first interface), KQd (second interface) and KQb (third interface) illustrated in FIG. 9 have the same functions as corresponding interfaces in FIG. 8. Mobility information or information about a number of user equipment in a predefined area is provided via the first interface from a Radio Network Controller (RNC) 904. Information about internet resources access to which is requested by UE 912 is received via the second interface from a Serving GPRS Support Node (SGSN) 906 operating in 3 G core network 914. Using the information provided via said first and second interfaces RnCN 902 determines if the internet resource should be cached by executing the algorithm discussed earlier. As is the embodiment illustrated in FIG. 8 also in the case of the network 900 the third interface 'KQb' FIG. 9) between the RnCN 902 and the GGSN 908 is used to update 206 the CDR (Call Data Records) of data connections to the internet 824. A new field in the CDR indicates Caching [enabled disabled]. When caching is enabled the RnCN 902 updates 206 the users CDR for the session to indicate if the user accessed the cached data.

Example Operation

It's 4.45 on a Saturday afternoon and 50,000 people are exiting football stadium and the surrounding area. Several thousand football fans begin to access the internet 824 to check the results from other matches on their mobile phones. Assume that the OSS/BSS management system has configured the RnCN 802 to operate when [threshold_2]>30,000 AND [threshold_1]>1,000. It is only under these configured circumstances that the caching algorithm will begin to operate, yet this configuration can be changed in the OSS/BSS. As there is a [threshold_2] of 50,000 people around the stadium, and as the number of requests to the same web site has passed 1,000, the data from this website starts to be cached. All subsequent requests to access this website from the mobile users are serviced from this cache. The cache for that particular URL is updated periodically every n seconds until the number of request subsides below a defined threshold.

If the time was 11.00 on a Tuesday morning then the area around the stadium would be relatively empty and the caching algorithm may not begin depending on how the RnCN 802 is configured for this specific area. In the Saturday afternoon example a [threshold_2]>30,000 AND [threshold_1]>1,000 was required. In this Tuesday morning example the caching algorithm would likely not be in operation under Saturday's configuration. However, the present invention is flexible enough to apply different configurations for different day of the week and/or different time of the day.

The present invention, as described above, allows for creating local cache, close to the user at time when it is needed, in place where it is needed and with a content that is required by the user. Once the demand for accessing the specific internet resource drops the cache is emptied and the logical function waits until the conditions for creation of the cache are met again.

The invention claimed is:

1. A method of providing access to internet resources in a wireless communications network, comprising:
   storing, in a memory located in said wireless communications network, at least one file from an internet resource if monitoring of user equipment in a predefined area shows that (A) a number of requests from said user equipment in said predefined area to access said internet resource exceeds a first threshold, and (B) a number of user equipment in said predefined area exceeds a second threshold representing a high density of user equipment in the predefined area, wherein said number of user equipment is determined based at least upon mobility information of said user equipment;
   providing access to said internet resource using said at least one file stored in said memory; and
   removing said at least one file from said memory if further monitoring shows that the number of requests from said user equipment in said predefined area to access said internet resource falls below a third threshold.

2. The method according to claim 1, comprising updating Call Data Records of users accessing the at least one file stored in said memory.

3. The method according to claim 1, comprising replacing the at least one file with a newer version of said file taken from said internet resource.

4. The method according to claim 3, wherein said replacing is carried out periodically.

5. The method according to claim 3, comprising monitoring the internet resource and replacing the at least one file if there is a newer version of said file stored in said internet resource.

6. The method according to claim 3, comprising storing an internet web site identified by a Universal Resource Locator of the internet resource requested by the user equipment.

7. The method according to claim 3, comprising removing said at least one file from the memory if a number of requests to access said file drops below a third threshold.

8. The method according to claim 1, further comprising:
   configuring the predefined area as at least one of a geographic area including one or more cells of the wireless communications network or as a geographic area within a predetermined distance from a geographic location.

9. The method according to claim 1, wherein the memory is located on a border between a radio network part and a core network part of the wireless communications network.

10. The method according to claim 1, further comprising deciding to activate the storing based on a density of users in the predefined area, wherein the density is determined based upon information obtained from a Mobility Management Entity, and wherein the storing is activated based upon the deciding.

11. The method according to claim 1, wherein the first threshold represents a high level of access to the at least one file by users in the predefined area, and wherein the second threshold represents a high density of user equipment of said users in the predefined area.

12. An apparatus for a wireless communications network, comprising:
   a plurality of interfaces to network nodes of said wireless communications network configured to receive from said network nodes information about a number of user equipment in a predefined area and information about internet resources requested to access by said user equipment; and
   a control unit, wherein if (A) a number of requests to access a specific internet resource from said user equipment in said predefined area exceeds a first threshold, and (B) a number of user equipment in said predefined area exceeds a second threshold representing a high density of user equipment in the predefined area, wherein said number of user equipment is determined based at least upon mobility information of said user equipment, said control unit is configured to request storing in a memory located in said wireless communications network at least one file from said specific internet resource requested by said user equipment, wherein said control unit being further configured to request removing said at least one file from said memory if further monitoring shows that the number of requests from said user equipment in said predefined area to access said internet resource falls below a third threshold.

13. The apparatus according to claim 12, comprising said memory.

14. The apparatus according to claim 12, further comprising a first interface for receiving said information about the number of user equipment in said predefined area from a Mobility Management Entity.

15. The apparatus according to claim 12, comprising a second interface for receiving from a Gateway GPRS Support Node or from a Packet Data Networking Gateway, or from a Serving Gateway, or from a Serving GPRS Support Node said information about internet resources requested to access by said user equipment.

16. The apparatus according to claim 15, comprising a third interface configured to provide information for updating Call Data Records of users accessing the at least one file stored in said memory, wherein the updated Call Data Records are used for charging users based on whether the at least one file is accessed in the memory or on a remote server in an external network.

17. The apparatus according to claim 16, wherein the third interface is configured to provide said information for updating Call Data Records to said Packet Data Networking Gateway or to said Gateway GPRS Support Node.

18. The apparatus according to claim 17, wherein the third interface is configured to provide said information for updating Call Data Records via a Serving Gateway.

19. The apparatus according to claim 12, wherein said apparatus is a standalone network node.

20. The apparatus according to claim 12, further comprising a first interface for receiving said information about the number of user equipment in said predefined area from a Radio Network Controller.

21. A wireless communications network, comprising:
a first network node for location registration of user equipment;
a second network node operating as a gateway between said wireless communications network and Internet; and
an apparatus comprising:
a plurality of interfaces to said first and second network nodes configured to receive via a first interface information from the first network node about a number of user equipment in a predefined area and via a second interface information from the second network node about internet resources requested to access by said user equipment; and
a control unit, wherein if (A) a number of requests to access a specific internet resource from user equipment in said predefined area exceeds a first threshold, and (B) a number of user equipment in said predefined area exceeds a second threshold representing a high density of user equipment in the predefined area, wherein said number of user equipment is determined based at least upon mobility information of said user equipment, said control unit is configured to request storing in a memory located in said wireless communications network at least one file from said specific internet resource requested by said user equipment, wherein the control unit being further configured to request removing said at least one file from said memory if further monitoring shows that the number of requests from said user equipment in said predefined area to access said internet resource falls below a third threshold.

* * * * *

UNITED STATES PATENT AND TRADEMARK OFFICE
CERTIFICATE OF CORRECTION

PATENT NO.        : 9,603,191 B2
APPLICATION NO.   : 12/936346
DATED             : March 21, 2017
INVENTOR(S)       : Cleary et al.

It is certified that error appears in the above-identified patent and that said Letters Patent is hereby corrected as shown below:

In the Specification

Column 3, Line 44, delete "predetermined" and insert -- predefined --, therefor.

Column 6, Line 3, delete "control unit 500" and insert -- control unit 506 --, therefor.

Column 6, Line 18, delete "GGSN 806." and insert -- GGSN 808. --, therefor.

Column 7, Line 44, delete "URL's" and insert -- URLs --, therefor.

Column 7, Line 46, delete "URL's" and insert -- URLs --, therefor.

Column 7, Line 62, delete "URI's" and insert -- URIs --, therefor.

Column 7, Line 63, delete "URL's" and insert -- URLs --, therefor.

Column 8, Line 57, delete "'KQb' FIG. 9)" and insert -- ('KQb' FIG. 9) --, therefor.

Column 8, Line 60, delete "[enabled disabled]." and insert -- [enabled|disabled]. --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*